US009612755B2

(12) United States Patent
Nath (10) Patent No.: US 9,612,755 B2
(45) Date of Patent: *Apr. 4, 2017

(54) B-FILE ABSTRACTION FOR EFFICIENTLY ARCHIVING SELF-EXPIRING DATA

(71) Applicant: Microsoft Technology Licensing, LLC, Redmond, WA (US)

(72) Inventor: Suman Kumar Nath, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,718

(22) Filed: Nov. 21, 2014

(65) Prior Publication Data

US 2015/0149708 A1 May 28, 2015

Related U.S. Application Data

(63) Continuation of application No. 12/165,466, filed on Jun. 30, 2008, now Pat. No. 8,924,362.

(51) Int. Cl.
*G06F 7/00* (2006.01)
*G06F 17/30* (2006.01)
*G06F 3/06* (2006.01)

(52) U.S. Cl.
CPC ............ *G06F 3/0613* (2013.01); *G06F 3/064* (2013.01); *G06F 3/0616* (2013.01); *G06F 3/0679* (2013.01); *G06F 17/30946* (2013.01)

(58) Field of Classification Search
CPC ........... G06F 17/30946; G06F 12/0223; G06F 12/023; G06F 12/0246
See application file for complete search history.

(56) References Cited

U.S. PATENT DOCUMENTS 4,888,691 A 12/1989 George et al.
5,392,415 A 2/1995 Badovinatz et al.
(Continued)

FOREIGN PATENT DOCUMENTS

WO 2007100197 A1 9/2007

OTHER PUBLICATIONS

Zeinalipour-Yazti et al, MicroHash: An Efficient Index Structure for Flash-Based Sensor Devices. Last accessed May 7, 2008, 14 pages.*

(Continued)

*Primary Examiner* — Marc Somers
(74) *Attorney, Agent, or Firm* — Rainier Patents, P.S.

(57) ABSTRACT

Systems and methods are provided for data processing and storage management. In an illustrative implementation an exemplary computing environment comprises at least one data store, a data processing and storage management engine (B-File engine) and at least one instruction set to instruct the B-File engine to process and/or store data according to a selected data processing and storage management paradigm. In an illustrative operation, the illustrative B-File engine can generate a B-File comprising multiple buckets and store sample items in a random bucket according to a selected distribution. When the size of the B-FILE grows to reach a selected threshold (e.g., maximum available space), the B-File engine can shrink the B-File by discarding the largest bucket. Additionally, the B-File engine can append data to existing buckets and explicitly cluster data when erasing data such that data can be deleted together into the same flash block.

20 Claims, 8 Drawing Sheets

(56) References Cited

U.S. PATENT DOCUMENTS

| | | | |
|---|---|---|---|
| 5,418,752 A | 5/1995 | Harari et al. | |
| 5,794,253 A | 8/1998 | Norin | |
| 5,809,558 A * | 9/1998 | Matthews | G06F 12/0246 707/999.202 |
| 6,012,064 A | 1/2000 | Gibbons et al. | |
| 6,115,708 A | 9/2000 | Fayyad et al. | |
| 6,279,069 B1 | 8/2001 | Robinson et al. | |
| 6,304,948 B1 | 10/2001 | Motoyama et al. | |
| 6,381,628 B1 | 4/2002 | Hunt | |
| 6,449,625 B1 | 9/2002 | Wang | |
| 6,519,604 B1 | 2/2003 | Acharya et al. | |
| 6,988,108 B2 | 1/2006 | Bernhardt et al. | |
| 7,024,401 B2 | 4/2006 | Harper et al. | |
| 7,028,054 B2 | 4/2006 | Harper et al. | |
| 7,155,560 B2 | 12/2006 | McGrew | |
| 7,203,792 B2 | 4/2007 | Lou | |
| 7,325,052 B1 | 1/2008 | Motoyama | |
| 7,353,350 B2 | 4/2008 | Klassen | |
| 7,360,096 B2 | 4/2008 | Bracewell et al. | |
| 8,001,320 B2 * | 8/2011 | Sokolov | G11C 16/20 365/185.01 |
| 8,352,519 B2 | 1/2013 | Nath et al. | |
| 8,924,362 B2 | 12/2014 | Nath | |
| 2004/0073567 A1 * | 4/2004 | Pelon | G06F 17/30575 707/102 |
| 2005/0060313 A1 * | 3/2005 | Naimat | G06Q 30/02 707/7 |
| 2006/0072400 A1 | 4/2006 | Anderson et al. | |
| 2006/0106852 A1 * | 5/2006 | Siddall | G06F 17/30147 707/101 |
| 2006/0155943 A1 * | 7/2006 | Todd | G06F 17/30097 711/161 |
| 2007/0113029 A1 | 5/2007 | Bennett et al. | |
| 2007/0113031 A1 * | 5/2007 | Brown | G06F 12/023 711/160 |
| 2007/0204141 A1 | 8/2007 | Yamaguchi et al. | |
| 2008/0059540 A1 | 3/2008 | Brown et al. | |
| 2008/0065815 A1 | 3/2008 | Nasu et al. | |

OTHER PUBLICATIONS

Babcock et al., "Models and Issues in Data Streams Systems," Proceedings of the Twenty-First ACM SIGMOD-SIGACT-SIGART Symposium on Principles of Database Systems, 2002, pp. 1-16, 16 pages.
Babcock et al., "Sampling From a Moving Window Over Streaming Data," Proceedings of the Thirteenth Annual ACM-SIAM Symposium on Discrete Algorithms, 2002, pp. 633-634, 2 pages.
Bash et al., "Approximately Uniform Random Sampling in Sensor Networks," Proceedings of the First Workshop on Data Management for Sensor Networks, Toronto, Canada, Aug. 30, 2004, 8 pages.
Efraimidis, Pavlos and Paul Spirakis, "Weighted random sampling with a reservoir," Information Processing Letters 97, 2006, pp. 181-185, 5 pages.
Jermaine, Christopher, "Online Random Shuffling of Large Database Tables," IEEE Transactions on Knowledge and Data Engineering, vol. 19, No. 1, Jan. 2007, pp. 73-84, 12 pages.
Kim et al., "LGeDBMS: a small DBMS for Embedded System with Flash Memory," VLDB'06, Sep. 12-15, 2006, Seoul, Korea, 4 pages.
Manku et al., "Random Sampling Techniques for Space Efficient Online Computation of Order Statistics of Large Datasets," Proceedings of the 1999 ACM SIGMOD International Conference on Management of Data, Rec. 28, 2, Jun. 1999, 12 pages.
Nath, Suman and Phillip Gibbons, "Online Maintenance of Very Large Random Samples on Flash Storage," Proceedings of the VLDB Endowment, vol. 1, No. 1, Aug. 2008, 14 pages.
Vitter, Jeffrey Scott, "An Efficient Algorithm for Sequential Random Sampling," ACM Transactions on Mathematical Software, vol. 13, No. 1, Mar. 1987, pp. 58-67, 10 pages.
Vitter, Jeffrey Scott, "Faster Methods for Random Sampling," Communications of the ACM, vol. 27, No. 7, Jul. 1984, pp. 703-718, 16 pages.
Vitter, Jeffrey Scott, "Random Sampling with a Reservoir," ACM Transactions on Mathematical Software, vol. 11, No. 1, Mar. 1985, pp. 37-57, 21 pages.
Wu et al., An Efficient R-Tree Implementation over Flash-Memory Storage Systems, GIS'03, Nov. 7-8, 2003, New Orleans, Louisiana, USA, 8 pages.
Zeinalipour-Yazti et al., "MicroHash: An Efficient Index Structure for Flash-Based Sensor Devices," USENIX FAST, 2005, 14 pages.
"Zeus-IOPS Solid State Drives Surge to 512GB in Standard 3.5" Form Factor; Offer Unprecedented Performance for Enterprise Computing," Published Apr. 18, 2007, retrieved at <<http://www.primenewswire.com/newsroom/news.html?d=117>> on May 6, 2008, 3 pages.
Agrawal et al., "Design Tradeoffs for SSD Performance," Usenix Annual Technical Conference, Jun. 2008, 14 pages.
Kim, Hyojun and Seongjun Ahn, "BPLRU: A Buffer Management Scheme for Improving Random Writes in Flash Storage," Usenix FAST'08: 6th USENIX Conference on File and Storage Technologies, 2008, 14 pages.
Lee et al., "Block Recycling Schemes and Their Cost-based Optimization in NAND Flash Memory Based Storage System," ACM/IEEE EMSOFT'07, Sep. 30-Oct. 3, 2007, Salzburg, Austria, 9 pages.
Reinsel, David and Jeff Janukowicz, "Datacenter SSDs: Solid Footing for Growth," Samsung White Paper, Jan. 2008, retrieved at <<www.samsung.com/.global/business/semiconductor/products/flash/ssd/pdf/datacenter_ssds. pdf>>, 7 pages.
SYCARD Technology, "CF extend 180 CompactFlash Flexible Extender Card," 2008, retrieved at <<http://www.sycard.com/cfext180.html>>, 2 pages.
Vitter, Jeffrey Scott, "External Memory Algorithms and Data Structures: Dealing with Massive Data," ACM Comput. Surveys, 33(2), Jun. 2001, pp. 209-271, 63 pages.
Non-Final Office Action mailed Mar. 2, 2011 from U.S. Appl. No. 12/184,213, 26 pages.
Response filed Jun. 3, 2011 to the Non-Final Office Action mailed Mar. 2, 2011 from U.S. Appl. No. 12/184,213, 15 pages.
Final Office Action mailed Aug. 2, 2011 from U.S. Appl. No. 12/184,213, 23 pages.
Response filed Oct. 6, 2011 to the Final Office Action mailed Aug. 2, 2011 from U.S. Appl. No. 12/184,213, 11 pages.
Non-Final Office Action mailed Oct. 27, 2011 from U.S. Appl. No. 12/184,213, 22 pages.
Response filed Jan. 17, 2012 to the Non-Final Office Action mailed Oct. 27, 2011 from U.S. Appl. No. 12/184,213, 10 pages.
Applicant-Initiated Interview Summary mailed Jan. 19, 2012 from U.S. Appl. No. 12/184,213, 3 pages.
Final Office Action mailed Mar. 5, 2012 from U.S. Appl. No. 12/184,213, 21 pages.
Applicant-Initiated Interview Summary mailed May 7, 2012 from U.S. Appl. No. 12/184,213, 3 pages.
Response filed Jul. 2, 2012 to the Final Office Action mailed Mar. 5, 2012 from U.S. Appl. No. 12/184,213, 15 pages.
Notice of Allowance and Examiner-Initiated Interview Summary mailed Sep. 11, 2012 from U.S. Appl. No. 12/184,213, 18 pages.
Non-Final Office Action mailed Jan. 13, 2011 from U.S. Appl. No. 12/165,466, 21 pages.
Response filed Apr. 11, 2011 to the Non-Final Office Action mailed Jan. 13, 2011 from U.S. Appl. No. 12/165,466, 16 pages.
Final Office Action mailed May 23, 2011 from U.S. Appl. No. 12/165,466, 17 pages.
Response filed Jul. 25, 2011 to the Final Office Action mailed May 23, 2011 from U.S. Appl. No. 12/165,466, 13 pages.
Non-Final Office Action mailed Dec. 10, 2012 from U.S. Appl. No. 12/165,466, 19 pages.
Response filed Apr. 10, 2013 to the Non-Final Office Action mailed Dec. 10, 2012 from U.S. Appl. No. 12/165,466, 12 pages.
Final Office Action mailed May 16, 2013 from U.S. Appl. No. 12/165,466, 21 pages.

(56) References Cited

OTHER PUBLICATIONS

Response filed Sep. 4, 2013 to the Final Office Action mailed May 16, 2013 from U.S. Appl. No. 12/165,466, 14 pages.
Non-Final Office Action mailed Dec. 9, 2013 from U.S. Appl. No. 12/165,466, 31 pages.
Response filed Mar. 10, 2014 to the Non-Final Office Action mailed Dec. 9, 2013 from U.S. Appl. No. 12/165,466, 12 pages.
Applicant-Initiated Interview Summary mailed Mar. 14, 2014 from U.S. Appl. No. 12/165,466, 3 pages.
Applicant-Initiated Interview Summary mailed Mar. 20, 2014 from U.S. Appl. No. 12/165,466, 3 pages.
Notice of Allowance mailed Apr. 2, 2014 from U.S. Appl. No. 12/165,466, 7 pages.
Notice of Allowance mailed Aug. 21, 2014 from U.S. Appl. No. 12/165,466, 10 pages.
Babcock et al., "Dynamic Sample Selection for Approximate Query Processing," ACM SIGMOD 2001, 12 pages.
Birrell et al., "A Design for High-Performance Flash Disks," SIGOPS Oper. Syst. Rev. 41, 2, 2007, 6 pages.
Chaudhuri et al., "Overcoming Limitations of Sampling for Aggregation Queries," 2001 IEEE ICDE, 9 pages.
Diao et al., "Rethinking Data Management for Storage-centric Sensor Networks," CIDR, 2007, 11 pages.
Douglis et al., "Storage Alternatives for Mobile Computers," USENIX OSDI, 1994, 33 pages.
Ganguly et al., "Bifocal Sampling for Skew-Resistant Join Size Estimation," SIGMOD'96, Montreal, Canada, 11 pages.
Ganti et al., "ICICLES: Self-tuning Samples for Approximate Query Answering," Proceedings of the 26th VLDB Conference, Cairo, Egypt, 2000, 12 pages.
Gemulla et al., "A Dip in the Reservoir: Maintaining Sample Synopses of Evolving Datasets," VLDB '06, Sep. 12-15, 2006, Seoul, Korea, 12 pages.
Gibbons, Phillip and Srikanta Tirthapura, "Estimating Simple Functions on the Union of Data Streams," ACM SPAA, 2001, Crete Island, Greece, 10 pages.
Hachman, Mark, "New Samsung Notebook Replaces Hard Drive With Flash," May 23, 2006, retrieved at <<http://www.extremetech.com/article2/0,1558,196644,00.asp?kc=ETP>> on May 6, 2008, 4 pages.
Hellerstein et al., "Informix under Control: Online Query Processing," Data Mining and Knowledge Discovery, 12, 281-314, 2000, 34 pages.
Jain et al., "Exploiting Mobility for Energy Efficient Data Collection in Wireless Sensor Networks," Mobile Networks and Applications 11, 327-339, 2006, 13 pages.
Jermaine et al., "A Novel Index Supporting High Volume Data Warehouse Insertions," Proceedings of the 25th VLDB Conference, Edinburgh, Scotland, 1999, 12 pages.
Jermaine et al., "Online Maintenance of Very Large Random Samples," ACM SIGMOD 2004, Jun. 13-18, 2004, Paris, France, 12 pages.
Lee, Sang-Won and Bongki Moon, "Design of Flash-Based DBMS: An In-Page Logging Approach," ACM SIGMOD'07, Jun. 11-14, 2007, Beijing, China, 12 pages.
Mathur et al., "Capsule: An Energy-Optimized Object Storage System for Memory-Constrained Sensor Devices," SenSys'06, Nov. 1-3, 2006, Boulder, Colorado, USA, 14 pages.
Miller, Paul, "SimpleTech announces 512GB and 256GB 3.5-inch SSD drives," posted Apr. 18, 2007, retrieved at <<http://www.endgadget.com/2007/04/18/simpletech-announces-512gb-a>> on May 6, 2008, 3 pages.
Nath, Suman and Aman Kansal, "FlashDB: Dynamic Self-tuning Database for NAND Flash," IPSN'07, Apr. 25-27, 2007, Cambridge, Massachusetts, USA, 10 pages.
Olken, Frank and Doron Rotem, "Random Sampling from Hash Files," 1990, SIGMOD, ACM 089791-365-5/90/0005/0375, 12 pages.
O'Neil et al., "The Log-Structured Merge-Tree (LSM-Tree)," Acta Inf. 33, 4, 1996, 32 pages.
Paulson, Linda Dailey, "Will Hard Drives Finally Stop Shrinking?", Computer, Technology News, May 2005, 3 pages.
Peterson, Michael, "ILM and Tiered Storage," Oct. 2005, retrieved at <<http://www.snia.org/forums/dmf/knowledge/DMF-SNS_Tiered_Storage_20051024.pdf>> on Apr. 30, 2008, 3 pages.
"Understanding the Flash Translation Layer (FTL) Specification," Dec. 1998, AP-684, retrieved at <<www.embeddedfreebsd.org/Documents/Intel-FTL.pdf>> on May 7, 2008, 20 pages.
"Using Total Recall," Oracle Technology Network, retrieved at <<http://www.oracle.com/technology/obe/11gr1_db/security/flada/flada.htm>> on Apr. 30, 2008, 8 pages.
Pugh, William, "Skip Lists: A Probabilistic Alternative to Balanced Trees," Communications of the ACM vol. 33, No. 6, Jun. 1990, 9 pages.

\* cited by examiner

B-FILE ABSTRACTION FOR EFFICIENTLY ARCHIVING SELF-EXPIRING DATA

BACKGROUND

Recent technological trends in flash media have made it an attractive alternative for data storage in a wide spectrum of computing devices such as PDA's, mobile phones, embedded sensors, MP3 players, etc. The success of flash media for these devices is due mainly to its superior characteristics such as smaller size, lighter weight, better shock resistance, lower power consumption, less noise, and faster read performance than disk drives. While flash-memory has been the primary storage media for embedded devices from the very beginning, there is an increasing trend that flash memory will infiltrate the personal computer market segment. As its capacity increases and price drops, flash media can overcome adoption as compared with lower-end, lower-capacity magnetic disk drives.

Current practices allow for running a full database system on flash-only computing platforms and running a light-weight database system on flash-based embedded computing devices. However, flash has fundamentally different read/write characteristics from other non-volatile media such as magnetic disks. In particular, flash writes are immutable and once written, a data page must be erased before it can be written again. Moreover, the unit of erase often spans multiple pages, further complicating storage management. With current practices, these unique characteristics can be hidden from applications via a software layer called the Flash Translation Layer (FTL), which enables mounting and using a flash media like a disk drive. Using the FTL, conventional disk-based database algorithms and access methods will function correctly without any modification.

However, since the FTL needs to internally deal with flash characteristics, many algorithms designed for magnetic disks are not likely to yield the best attainable performance. For example, algorithms that overwrite data in place may work well with magnetic disks, but will perform poorly with flash media. Thus, in order to make a flash-based storage systems efficient, many algorithms need to be redesigned to take flash characteristics into account.

As a specific example, consider maintenance of a very large (e.g., several gigabytes) random sampling of an evolving data stream. In this context, random sampling is a approximation technique used in many applications including data mining, statistics, and machine learning. In many scenarios, the sample needs to be very large to be effective. For example, when the underlying data has a high variance, a very large sample is required to provide accurate estimates with suitably high confidence. Moreover, variance in the data is often magnified by standard database operators like selections and joins, increasing the size of the sample required to ensure a target approximation accuracy. Another example is sensor networks, where each sensor collects too many readings to store all of them in its limited storage, and transmitting all its readings to a base station expends too much of its limited battery. In such a case, it is desirable for the sensor to maintain a random sample of its readings. Operatively, queries can be pushed to the sensor nodes, and answered using the sample points falling within a specified time window. Humans or data mules traveling next to a sensor node can be used to retrieve its sample for offline data mining or statistical analysis purposes; while such mules minimize the energy cost of retrieving data, they typically pass by a sensor node far too infrequently to collect more than a sample of its readings. It is desirable that the sample maintained on the sensor node is large (in many cases, as large as possible) because (i) scientists deploying the sensors usually want to collect as much data as possible, and (ii) a very large sample helps ensure that there will be a sufficient number of sample points within every time-window of interest.

However, currently deployed sampling algorithms are lacking since they do not offer one or more of the following properties, the algorithm is suitable for streaming data, or any similar environment where a large sample must be maintained online in a single pass through the dataset; the algorithm must be efficient, in terms of latency or energy, on flash; i.e., it should be flash-aware and it should avoid operations (e.g., in-place updates) that are expensive on flash; and the algorithm should be tunable to both the amount of flash storage and the amount of standard memory (DRAM) available to the algorithm. Thus, the algorithm can be tunable to a specified bounded sample size, and DRAM-constrained embedded devices can use the algorithm, while less constrained devices can take advantage of the larger available DRAM.

For example, reservoir-sampling and geometric file are two algorithms for maintaining a bounded size sample. Both can be implemented to maintain a sample on flash media, but both require many in-place updates on flash and, hence, are very slow and energy expensive in flash. Moreover, geometric file has a large DRAM footprint, and hence is not suitable for most embedded systems.

It is appreciated that although current practices for the storage and management of data on flash media have been described to be lacking in the context of data sampling operations that such description is not inclusive of other operational deficiencies experienced when performing current practices. For example, such deficiency exist for other data management algorithms that require "expiring" old data. In such scenario, in an archival system, one may decide to expire old data in case available storage space does not allow for archiving all of the data. It is further appreciated that such deficiencies resulting from existing practices can be alleviated by systems and methods providing a B-File which allows for the efficient storage of "self-expiring" data on flash media and that can be deployed by various data storage and management algorithms including but not limited to sampling algorithms, archiving algorithms, etc.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for systems and methods to for data processing and storage management. In an illustrative implementation an exemplary computing environment comprises at least one data store operative to store one or more data elements, a data processing and storage management engine (B-File engine), and at least one instruction set to instruct the B-File engine to process and/or store data according to a selected data processing and storage management paradigm. In the illustrative implementation, the data processing and storage management paradigm allows for the storage of data according to data buckets.

In an illustrative operation, the exemplary B-File engine can generate a B-File that can comprise multiple buckets and store items in a random bucket according to a selected distribution that can be dependent on the desired algorithm's properties and various overhead trade-offs. In the illustrative operation, the B-File can be deployed by a data sampling algorithm where items can be assigned to buckets depending on properties including but not limited to whether the items are sampled uniformly, randomly, or according to the items' weights.

In the illustrative operation, when the size of the –B-File grows to reach a selected threshold (e.g., maximum available space), the B-File engine can operatively shrink the B-File by discarding one of the buckets, for example, the largest bucket. In the illustrative operation, the B-File engine can perform one or more operations in managing the B-File comprising appending data to existing buckets and explicit clustering of data when erasing data such that data can be deleted together into the same flash block to optimize flash media data erasure.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

B-File Extraction Overview:

The herein described systems and methods ameliorate the shortcomings of existing practices by providing for and utilizing a B-File (bucket file) to maintain a large sample of data in flash media. Is it appreciated that although the B-File is described in context of maintaining a data sample, that such description is merely illustrative since the herein described systems and methods allow for the use of B-File by other data management and/or storage processes including those where data expires and needs to be discarded after some time.

In an illustrative implementation, a B-File can comprise multiple buckets such that, operatively, one or more data items that are included in a data sample are stored in a random bucket according to a selected data distribution. Illustratively, the exemplary selected data distribution can be dependent, preferably in a non-trivial manner, on various characteristics of the data environment including but not limited to desired sample properties (e.g., uniform, biased, etc.) and various overhead trade-offs. In an illustrative operation, when the size of the B-File grows to reach a selected threshold (e.g., maximum available space), the herein described systems and methods prescribe shrinking the data set by illustratively discarding the largest bucket.

The B-File deployment provides for various efficiencies over existing practices that can be attributed to various B-File properties including but not limited to data is appended to existing buckets, instead of overwriting any existing data on flash; and the B-File when deployed explicitly clusters data to be deleted into the same flash block so that data can be efficiently erased.

It is appreciated that a B-FILE is a general abstraction and can be used for many purposes other than sampling. For example, it can be used to archive data and to automatically age it, based on arrival time or priority of the data, to and reclaim storage space for newly-arriving data. In this context of sensor networks where sensors have limited storage and are deployed in remote areas for long periods without human intervention a B-File deployment can provide efficiencies.

In am illustrative implementation, a B-FILE can comprise a set of application buckets $\cup_i B_i$ stored illustratively on a flash media. Physically, however, a B-FILE can operatively store these buckets, in the illustrative implementation, as a collection of N "individual" buckets holding the first N application buckets and one "tail" bucket holding the remaining buckets. As a matter of nomenclature, the N application buckets can be referred to as "application buckets" and the tail bucket can be referred to as "B-File" buckets.

Figure 1:
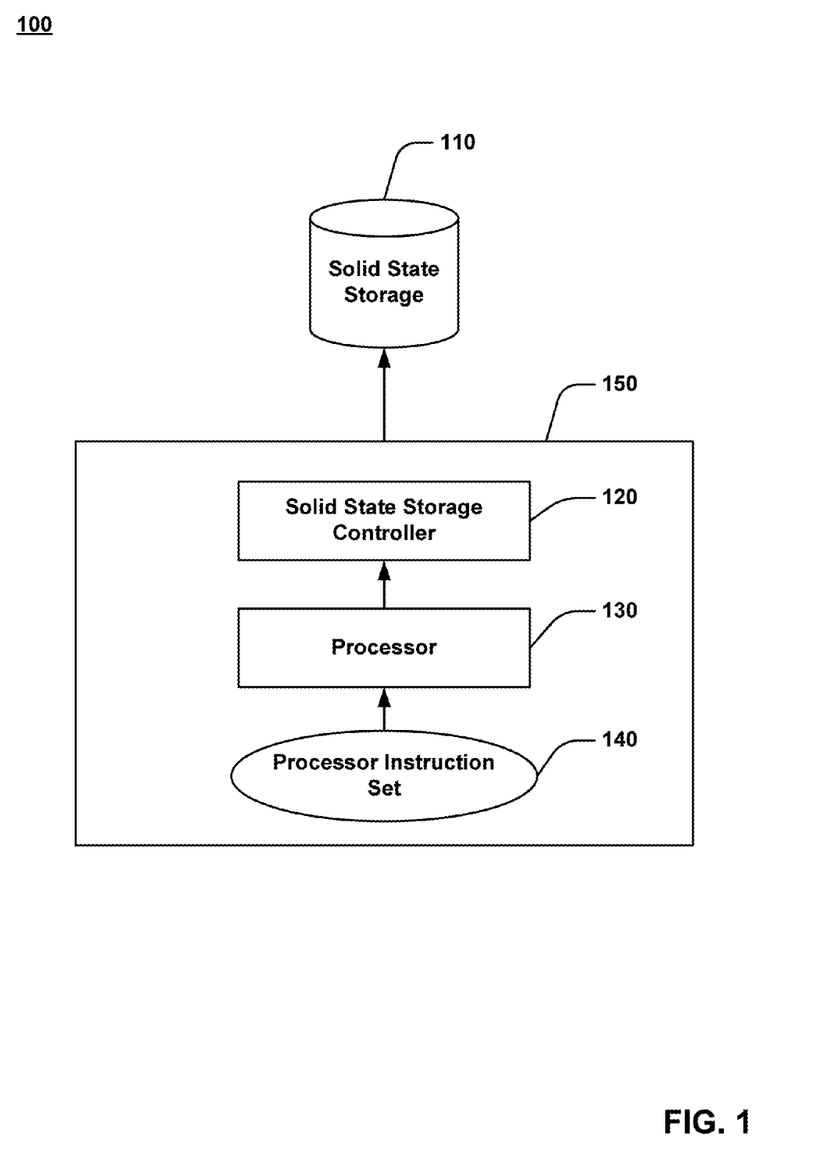
FIG. 1 is a block diagram of one example of an exemplary computing environment in accordance with the herein described systems and methods.

Data Processing and Management Using B-Files:

FIG. 1 describes an exemplary computing environment 100 operable to control and manage data storage on solid state storage (e.g., flash media). As is shown, in an illustrative implementation, exemplary computing environment 100 comprises computer environment 150 and solid state storage device 110. Further, as is shown, computer environment 150 comprises solid storage device controller 120, processor 130, and processor instruction set 140.

In an illustrative operation, computing environment 100 can process data for storage and management on solid state storage device 110. In the illustrative operation, processor 130 of computer environment 150 can process data for storage and management on solid state storage device 110 by executing one or more instructions from processor instruction set 140 allowing for the storage and/or management data on solid state storage device 110 through solid state storage controller 120. Operatively, solid state storage controller 120 directed by processor 130 can store and/or manage data on solid state storage device 110 according to one or more data storage principles applicable to the storage and/or management of data on solid state storage devices.

In an illustrative implementation, exemplary data storage principles include but are not limited to deleting items in batch and cluster items to delete together in as few blocks as possible. Stated differently, deleting data in a solid state storage devices (e.g., flash media) generally requires a block erase operation. That is, before erasing a block, valid data in the block needs to be copied to some other location, which requires reading and writing all the valid data. The amortized cost of deleting an item can be made orders of magnitude smaller by deleting multiple items with a single erase operation. This can be done by clustering data that will be deleted together in the same block.

A second exemplary principle considers updating data already written to flash media. Stated differently, flash media does not allow updating data in place. Another exemplary principle considers allocating and de-allocating storage space in granularity of blocks. Possible choices for an allocation/de-allocation size can include: (i) sub-page granularity, where fractions of a single flash page are allocated independently (i.e., the same flash page can contain multiple independent data units), (ii) page granularity, where each entire page is allocated independently, and (iii) block granularity, where each entire flash block is allocated independently.

Another solid state storage operating principle considers avoiding random writes in flash media. Generally, flash media is an electronic device and thus has no mechanically moving parts like disk heads in a magnetic disk drive. Therefore, a raw flash memory chip can provide similar sequential and random access speed. However, flash media generally provide poor random write performance.

It is appreciated that although solid state storage device 110 is shown to be independent of computer environment 150 that such description is merely illustrative as the inventive concepts described herein also are applicable to a computing environment 100 which includes a solid state storage device/component within a computer environment as well.

Figure 2:
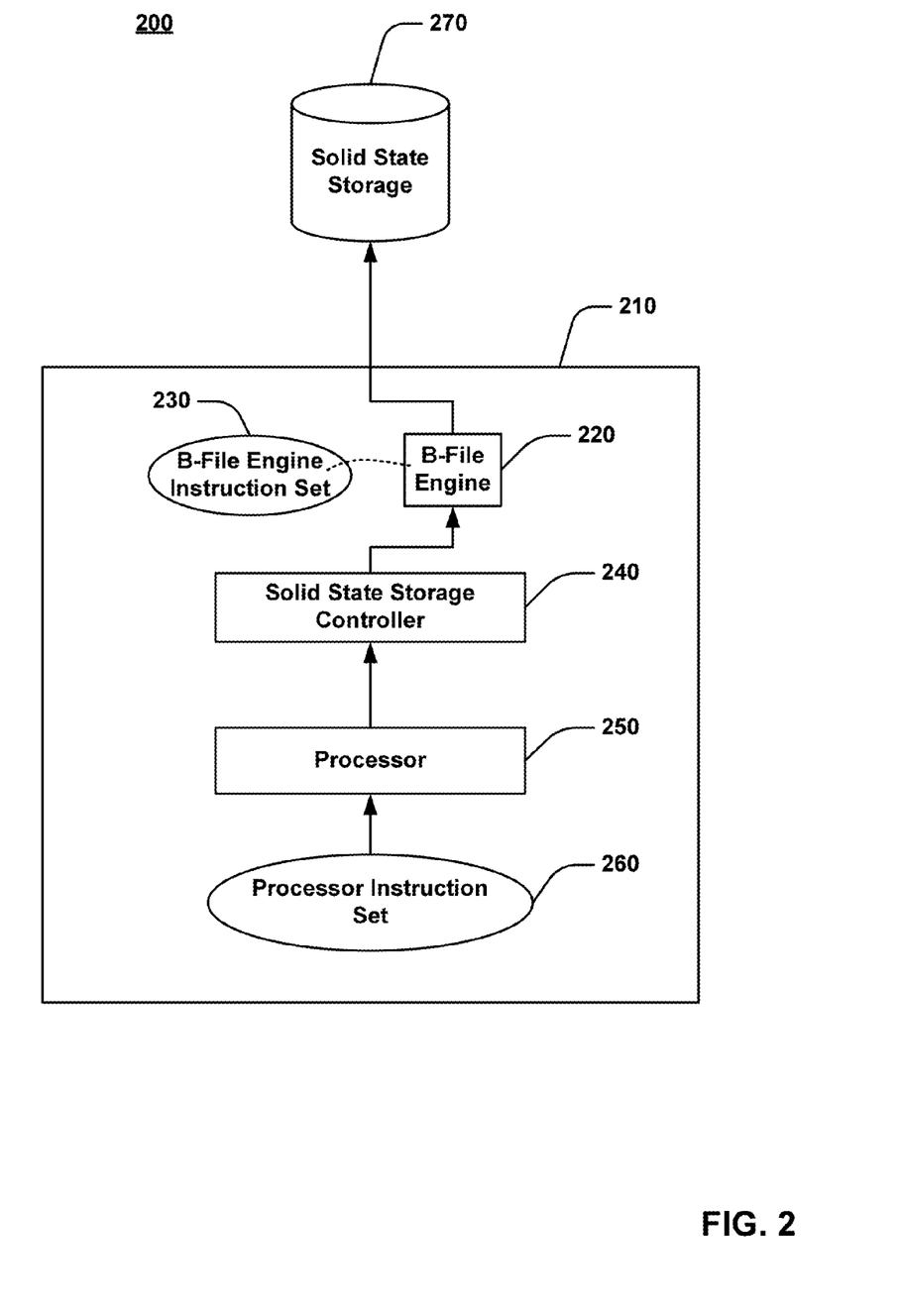
FIG. 2 is a block diagram of one example of an exemplary computing environment deploying B-File memory management in accordance with the herein described systems and methods.

FIG. 2 describes exemplary computing environment 200 operable to control and manage data storage on solid state storage (e.g., flash media). As is shown in FIG. 2, in an illustrative implementation, exemplary computing environment comprises computer environment 210 and solid state storage device 270. Further, as is shown, computer environment 210 comprises processor 250, processor instruction set 260, solid state storage controller 240, B-File engine 220, and B-File engine instruction set 230. In the illustrative implementation, processor 250, solid state storage controller 240, B-File engine 220, and solid state storage device 270 are electronically coupled allowing for the communication of various data and/or instructions for storage and/or execution.

In an illustrative operation, computing environment 200 can process data for storage and management on solid state storage device 270. In the illustrative operation, processor 250 of computer environment 210 can process data for storage and management on solid state storage device 270 by executing one or more instructions from processor instruction set 260 allowing for the storage and/or management data on solid state storage device 270 through solid state storage controller 240, B-File engine 220 operating according to one or more instructions provided by B-File engine instruction set 230. Operatively, solid state storage controller 240 directed by processor 250 can store and/or manage data on solid state storage device 170 according to one or more data storage principles applicable to the storage and/or management of data on solid state storage devices as illustratively provided by B-File engine 220 operating according to one or more instructions provided by B-File engine instruction set 230.

In the illustrative operation, the B-File engine 220 processes one or more instructions from B-File engine instruction set 230 to store data according to selected solid state media (e.g., flash media) data storage and management paradigm utilizing illustrative B-Files. In the illustrative implementation, a B-File can comprise a large set of application buckets $\cup_i B_i$ stored on a flash media. Physically, the B-File can illustratively store these buckets in a collection of N "individual" buckets holding the first N application buckets and one "tail" bucket holding all the remaining (typically very small) buckets.

At a high level, the B-File can operatively support the following exemplary operators: new B-File(N): Create a new B-File with N individual B-File buckets plus one tail B-File bucket; AddItem(v,i): Add item v to application bucket $B_i$; size and size(i): Return the number of items in the entire B-File or in application bucket $B_i$; and DiscardBucket (i): Discard the items in application bucket $B_i$, and reclaim the space.

Illustratively, when used in context to a sampling algorithm, the sizes of individual application buckets can operatively exponentially decrease, with the first bucket $B_i$ being the largest. At any point of time, the contents of the buckets can represent the random sample S over the entire data stream S'.

Figure 3:
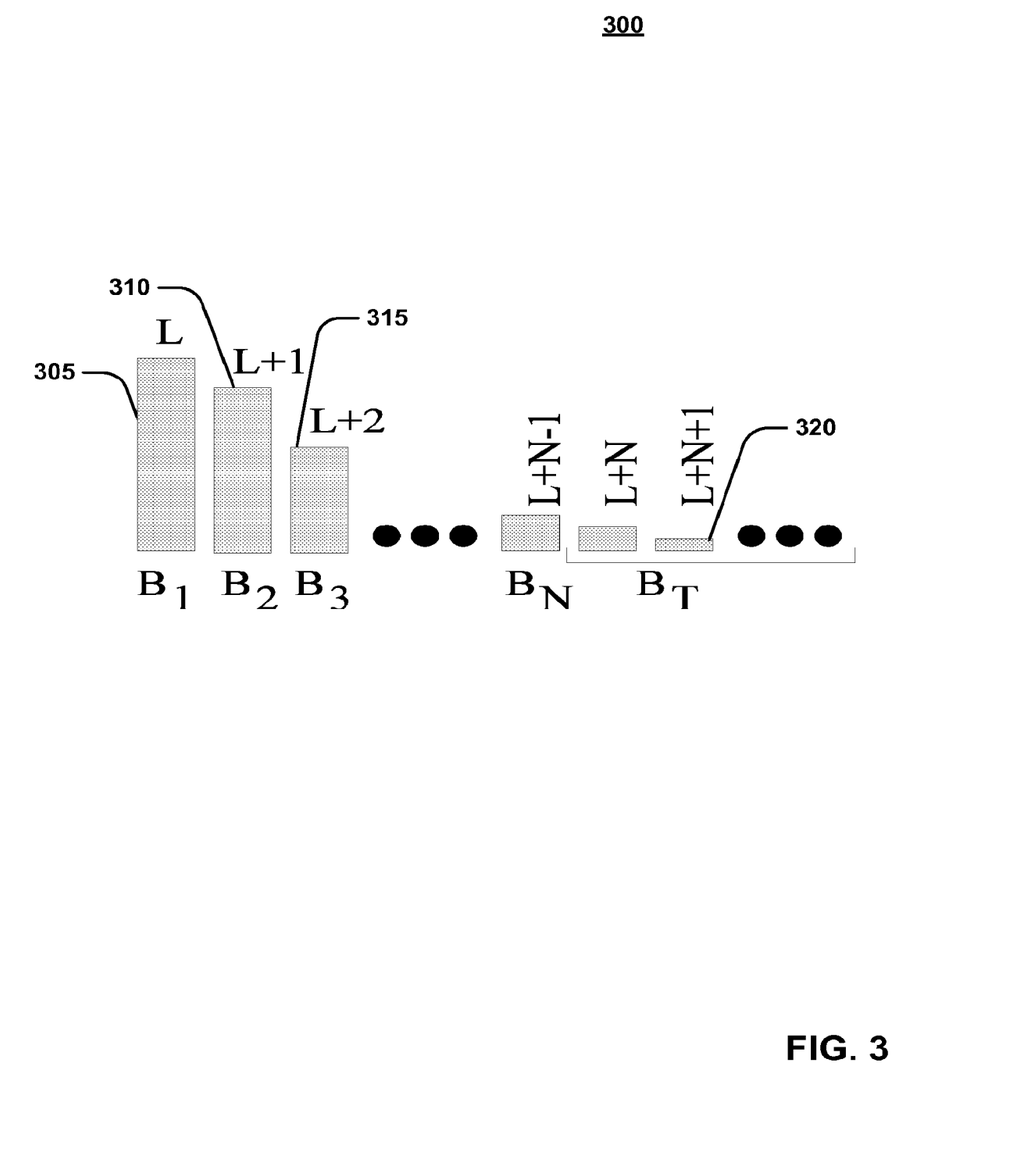
FIG. 3 is a block diagram of an exemplary B-File in accordance with the herein described systems and methods.

FIG. 3 depicts an exemplary snapshot of exemplary B-File 300. As is shown in FIG. 3, solid bars 305, 310, 315, up to and including 320, can illustratively represent application buckets. In an illustrative implementation, text above a bar can represent the level of the items in the buckets 305, 310, 315, up to and including 320, and text below a bucket can illustratively represent the B-File bucket number. In the illustrative implementation, the tail B-File bucket BT can illustratively contain items with a selected threshold level (e.g., level L+N).

Figure 4:
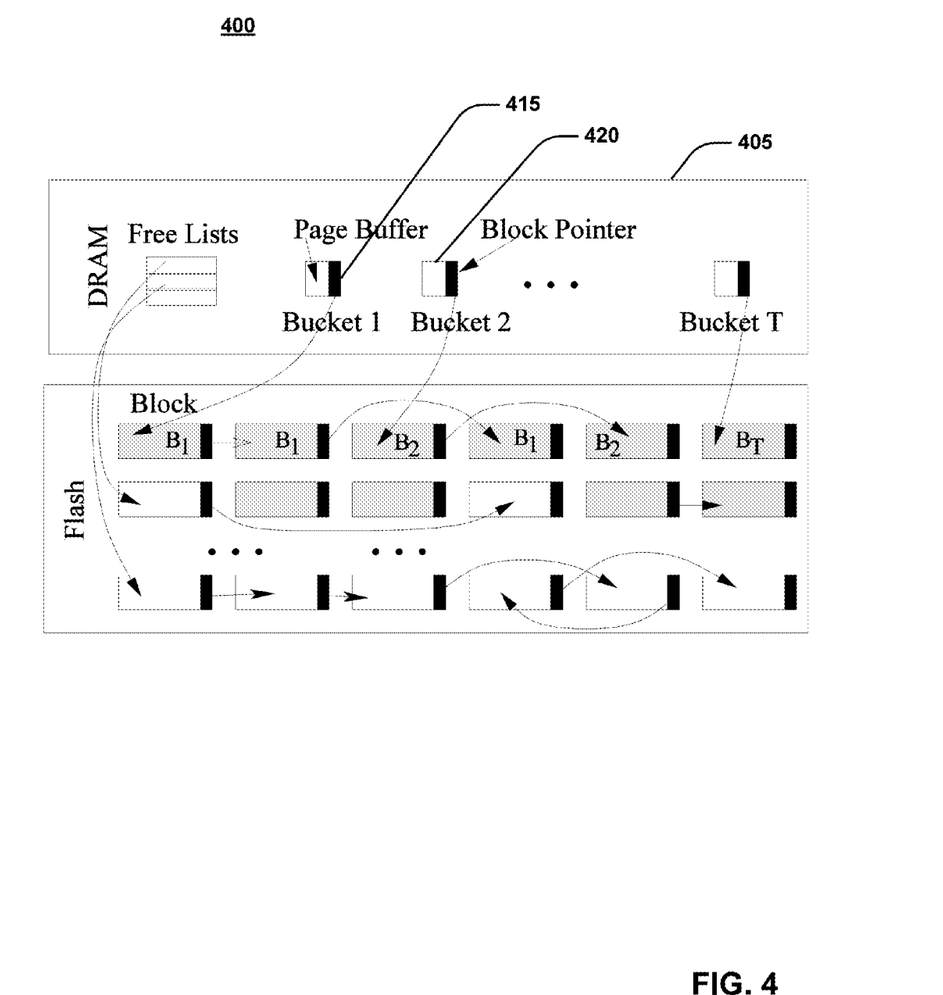
FIG. 4 is a block diagram of the schematic of a decision tree representative of B-File memory management in accordance with the herein described systems and methods.

FIG. 4 depicts an exemplary physical layout of exemplary B-File buckets (e.g., 305, 310, 315, up to and including 320 of FIG. 3). As is shown in FIG. 4, section 405 illustratively describes an in-memory portion of the B-File bucket. In an illustrative implementation, for a B-File bucket $B_i$ (including the tail bucket), an in-memory data structure called $B_i$.header can be maintained in the in-memory portion 405. The header can illustratively comprise a page buffer 415 that can temporarily hold one flash page worth of data, and a block pointer 420 that can exemplary point to the first flash block containing the items in that block.

In an illustrative operation, when an item is added to a bucket, it is temporarily put in its page buffer 415. When the page buffer 415 holds one page worth of data, the buffer is flushed to the next available page within the block pointed to by the block pointer. Search or retrieval of items in a bucket starts with the block pointer. In the illustrative implementation, an exemplary B-File engine (e.g., 220 of FIG. 2) can illustratively write in-memory 405 buffers to flash pages. When the buffer holds one page worth of data, the buffer can be flushed to the next available page within the block h pointed by the block pointer. When no empty page is available in that block h, a new block h' is allocated by the exemplary B-File engine.

A pointer 420 to the block h can be stored at the end of block h' and the block pointer is updated to h'. In the illustrative implementation, the blocks in a bucket can be chained together with backward pointers and the address of the last block is maintained in the block pointer. Further, in the illustrative implementation, an exemplary B-File engine can keep track of available blocks and allocate them on demand. When the B-File engine discards a bucket, the block pointer of the bucket can be returned.

In the illustrative implementation, the size of exemplary B-File 400 can fluctuate between two user-specified bounds $s_{min}$ and $s_{max}$. In the illustrative implementation, there can exist a non-trivial interaction between the cost of maintaining samples in a B-File, and the difference $\delta=s_{max}-s_{min}$. Illustratively, a large value of $\delta$ is not desirable, since buckets are discarded less frequently and more items are added to the B-File (some of which are discarded later). Illustratively, a small value of $\delta$ is not desirable either, because then the tail bucket can contain a large number of items, increasing the cost of log unroll.

Figure 5:
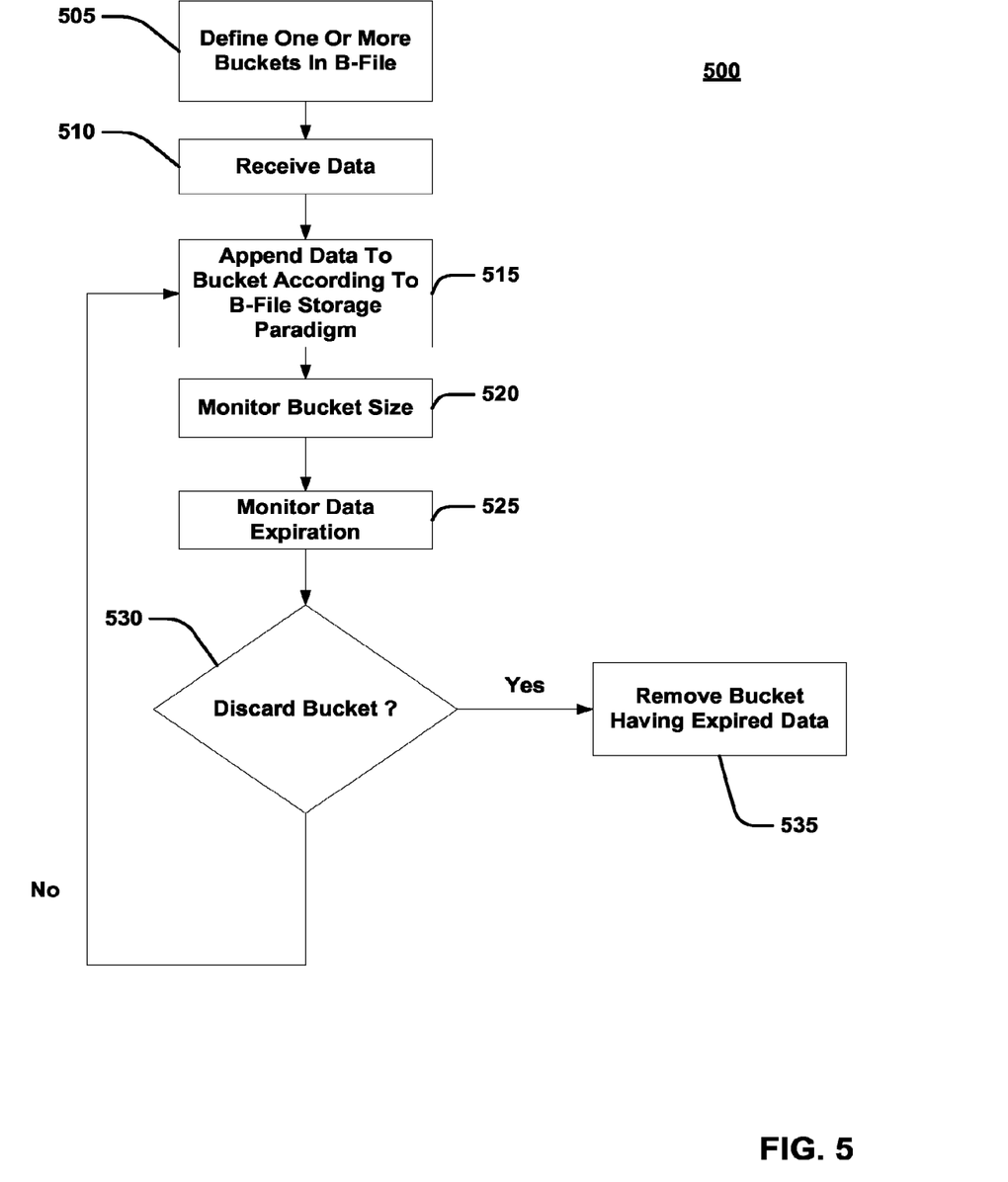
FIG. 5 is a flow diagram of an exemplary method performed for memory management using B-File abstraction in accordance with the herein described systems and methods.

FIG. 5 is a flow diagram of an exemplary method 500 for managing and/or storing data using a B-File. As is shown, processing begins at block 505 where one or more buckets in the B-File are defined. Processing then proceeds to block 510 where sample data is received. The received data is then processed and appended to a selected bucket according to a B-File storage paradigm at block 515. From there, processing proceeds to block 520 where the bucket size is monitored. The data expiration is also monitored at block 525. A check is then performed at block 530 to determine whether the monitored bucket should be discarded.

If the check at block 530 determines that the monitored bucket is to be discarded (e.g., the data in the bucket is to be deleted), processing proceeds to block 535 where the bucket having the expiring data is removed. However, if the check at block 530 indicates that the monitored bucket is not to be discarded, processing reverts back to block 515.

Figure 6:
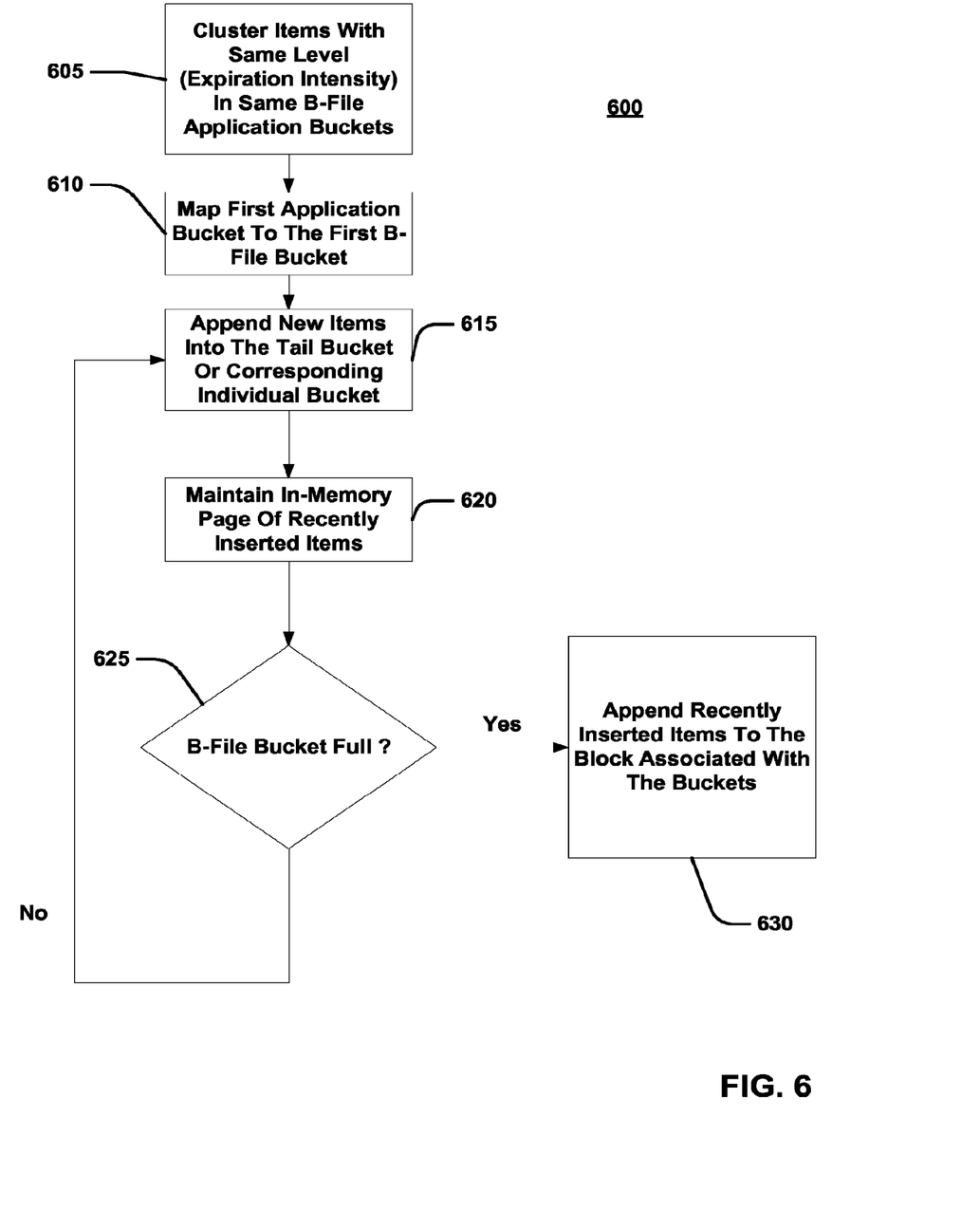
FIG. 6 is a flow diagram of another exemplary method performed for B-File abstraction in accordance with the herein described systems and methods.

FIG. 6 is a flow diagram of an exemplary method 600 to append data in a B-File. Processing begins at block 605 where items having the same level (e.g., expiration intensity) are clustered in the same B-File application buckets. From there processing proceeds to block 610 where the first application bucket is mapped to the first B-File bucket. New items are then appended into the tail bucket or the corresponding individual bucket at block 615. From there, processing proceeds to block 620 where an in-memory page of recently inserted items is inserted into the selected B-File bucket. A check is performed at block 625 to determine if the B-File bucket to which items are being amended is full. If the check at block 625 determines that the B-File bucket is full, processing proceeds to block 630 where the recently inserted items are inserted to the block associated with the buckets. However, if the check at block 625 indicates that the B-File bucket is not full, processing reverts to block 615 and proceeds from there.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
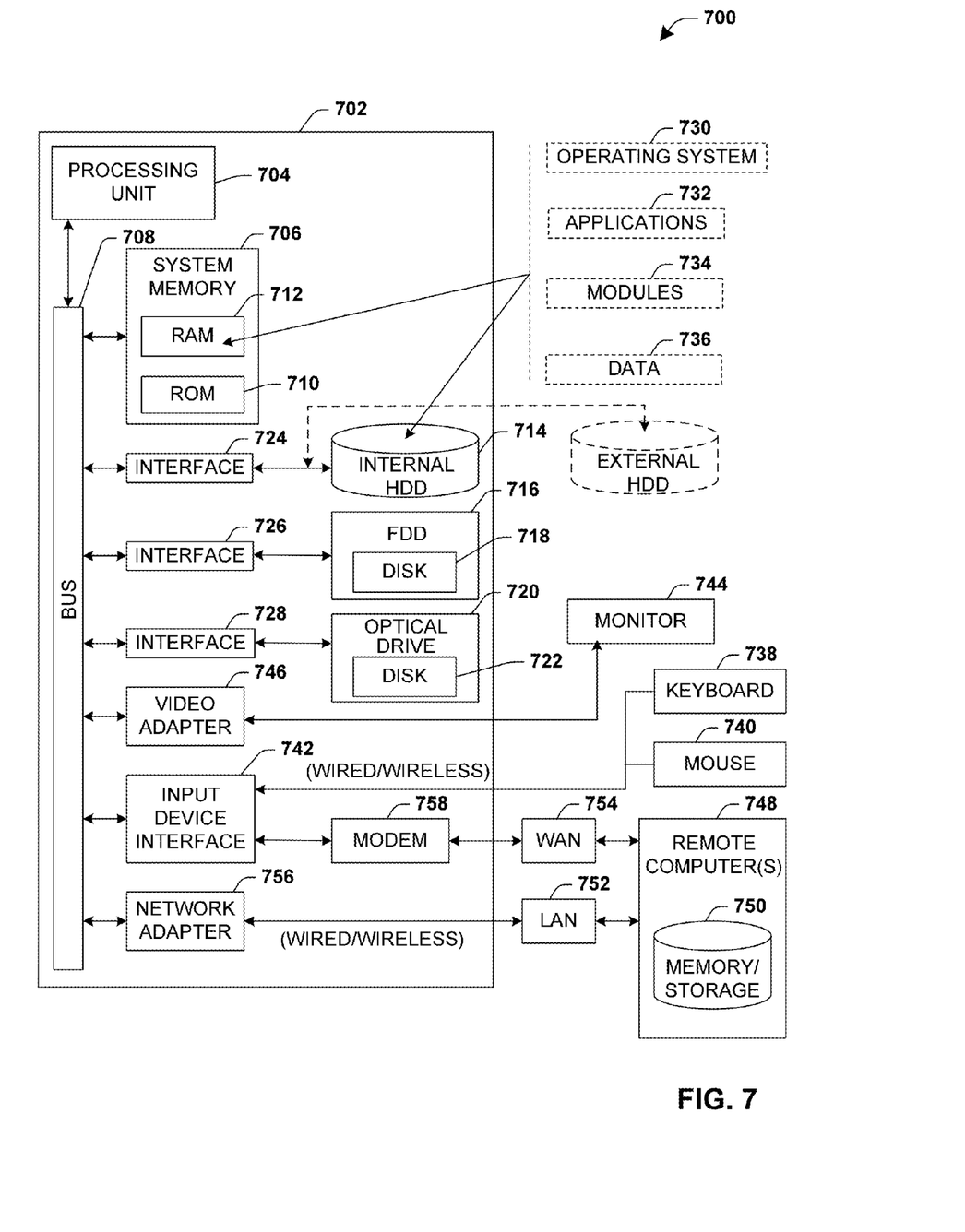
FIG. 7 is a block diagram of an exemplary computing environment.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
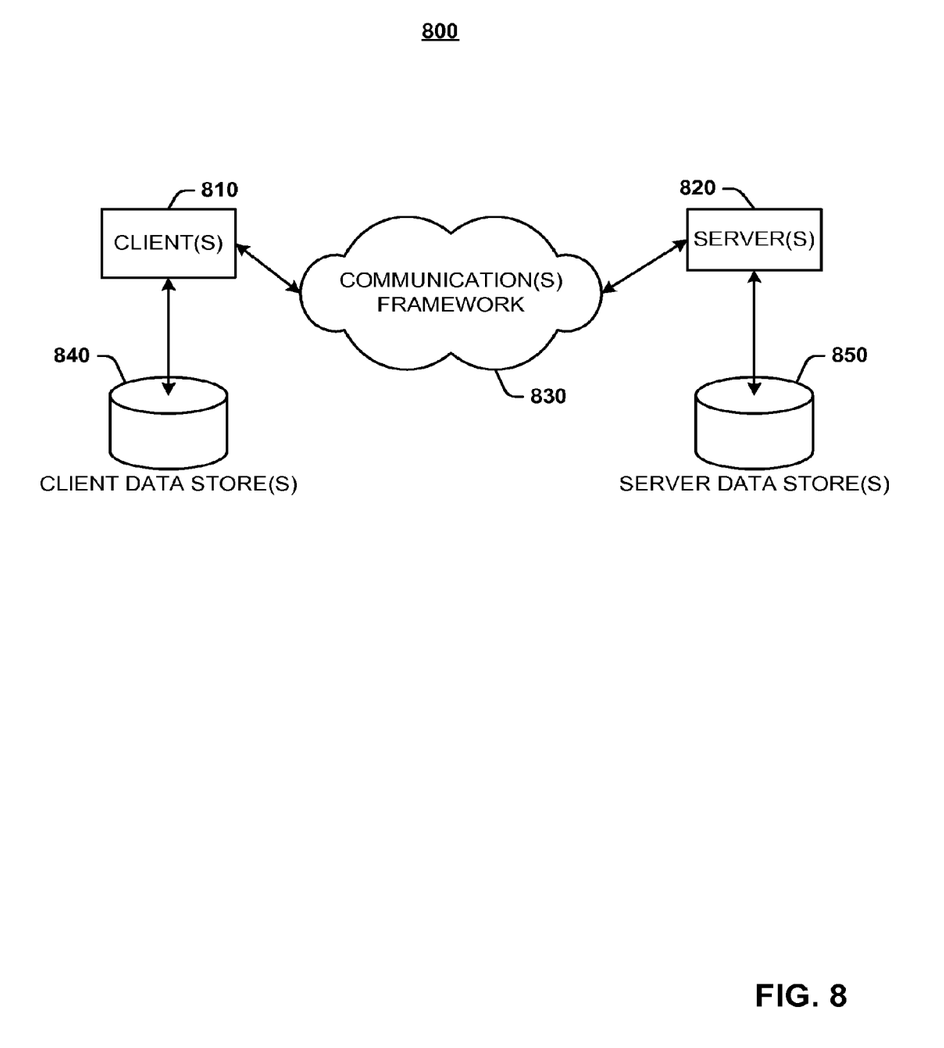
FIG. 8 is a block diagram of an exemplary networked computing environment.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
receiving data items for storage on a solid state persistent storage device having multiple storage blocks;
creating a file having multiple storage buckets for storing the data items;
determining different expiration intensities for the data items, wherein the expiration intensities of the data items are determined by one or more attributes of the data items;
assigning the data items to different assigned storage buckets of the file based at least on the expiration intensities;
designating different in-memory page buffers for the assigned storage buckets and temporarily storing the data items in the in-memory page buffers for the assigned storage buckets;
flushing the data items from the in-memory page buffers to the solid state persistent storage device by appending the data items to previously-stored data items such that data items within a given assigned storage bucket are clustered together in corresponding blocks of the solid state persistent storage device; and
erasing storage blocks of an expiring storage bucket on the solid state persistent storage device via one or more erase operations, wherein the expiring storage bucket is selected for the erasing based at least on the expiration intensity of corresponding expiring data items stored in the expiring storage bucket.

2. The method of claim 1, wherein the one or more attributes of the data items used to establish the expiration intensities include at least one non-temporal attribute.

3. The method of claim 2, wherein the at least one non-temporal attribute used to establish the expiration intensities is a priority of the data items.

4. The method of claim 3, wherein, as the data items are received, the data items are appended within the corresponding blocks without overwriting existing data in the corresponding blocks.

5. The method of claim 1, wherein the data items are flushed as the in-memory page buffers become full.

6. The method of claim 5, wherein the erasing comprises erasing all storage blocks that store data items from the expiring storage bucket.

7. A system comprising:
a non-volatile solid state storage device having multiple storage blocks;
a memory device; and
a control device configured to:
obtain data items for storage on the non-volatile solid state storage device, the data items having associated attributes;
establish different expiration intensities for the data items using the associated attributes of the data items;
assign the data items to different assigned storage buckets of a file based at least on the different expiration intensities;
designate different in-memory page buffers for the assigned storage buckets and temporarily store the data items in the in-memory page buffers on the memory device;
flush the data items from the in-memory page buffers to the non-volatile solid state storage device by appending the data items to previously-stored data items that are already stored on the non-volatile solid state storage device, wherein the data items and the previously-stored data items are clustered together by storage bucket assignments in individual blocks of the non-volatile solid state storage device; and
erase certain storage blocks of the solid state storage device that store expiring data items from an expiring storage bucket based at least on corresponding expiration intensities of the expiring data items.

8. The system of claim 7, wherein the control device comprises a hardware processing unit, a solid state storage device controller, or both.

9. The system of claim 7, wherein the control device is configured to:
monitor sizes of the multiple storage buckets over time; and
as particular storage buckets reach a specified bucket size, designate the particular storage buckets for erasing.

10. The system of claim 7, wherein the memory device is volatile.

11. The system of claim 10, wherein the control device is further configured to:
maintain a first in-memory page buffer of first data items assigned to a first bucket and a second in-memory page buffer of second data items assigned to a second bucket;
at a first time when the first in-memory page buffer becomes full, flush the first in-memory page buffer of first data items to the non-volatile solid state storage device by appending the first data items to other first data items assigned to the first bucket that are already stored on the non-volatile solid state storage device; and
at a second time when the second in-memory page buffer becomes full, flush the second in-memory page buffer of second data items to the non-volatile solid state storage device by appending the second data items to other second data items assigned to the second bucket that are already stored on the non-volatile solid state storage device.

12. The system of claim 10, wherein the control device is further configured to:
chain corresponding blocks of a first individual bucket together using pointers; and
maintain an in-memory block pointer that points to a particular block of the first individual bucket.

13. A system comprising:
a non-volatile solid state storage device having multiple storage blocks;
a hardware processing unit; and
a memory device storing computer-readable instructions that cause the hardware processing unit to:
obtain data items for storage on the non-volatile solid state storage device, the data items having associated attributes;

establish different expiration intensities for the data items using the associated attributes of the data items;

assign the data items to different assigned storage buckets based at least on the different expiration intensities;

designate different in-memory page buffers for the assigned storage buckets and temporarily store the data items in the in-memory page buffers on the memory device;

flush the data items from the in-memory page buffers to the non-volatile solid state storage device by appending the data items to previously-stored data items that are already stored on the non-volatile solid state storage device, wherein the data items and the previously-stored data items for a given storage bucket are clustered together in individual blocks of the non-volatile solid state storage device; and erase individual storage blocks that store expiring data items from an expiring storage bucket based at least on corresponding expiration intensities of the expiring data items, the individual storage blocks being erased via one or more block erase operations.

14. The system of claim 13, wherein the computer-readable instructions cause the hardware processing unit to:

repeatedly make determinations that a size of a file containing the different storage buckets has reached a threshold; and repeatedly erase the individual storage blocks of the expiring storage bucket responsive to the determinations.

15. The system of claim 13, wherein the computer-readable instructions cause the hardware processing unit to:

append first data items of a first storage bucket to other first data items of the first storage bucket on the non-volatile solid state storage device without overwriting any of the other first data items.

16. The system of claim 13, wherein the different storage buckets have different sizes.

17. The system of claim 13, wherein the one or more block erase operations are performed such that all data items with the same expiration intensity are deleted together.

18. The system of claim 13, wherein the non-volatile solid state storage device is a flash storage device.

19. The system of claim 13, wherein the computer-readable instructions cause the hardware processing unit to:

flush the in-memory page buffers of the data items as individual in-memory page buffers reach one page worth of data.

20. The system of claim 19, wherein each in-memory page buffers stores only particular data items that each share a particular expiration intensity for an associated storage bucket.

* * * * *